United States Patent [19]
Nelson et al.

[11] Patent Number: 6,053,194
[45] Date of Patent: Apr. 25, 2000

[54] DUCKBILLED CHECK VALVES AND METHODS OF MAKING AND USING SAME

[75] Inventors: Cory J. Nelson, Racine; Peter M. Neumann, Mt. Pleasant; Robert W. Balfanz, Caledonia, all of Wis.

[73] Assignee: S. C. Johnson & Son, Inc., Racine, Wis.

[21] Appl. No.: 09/394,315

[22] Filed: Sep. 10, 1999

[51] Int. Cl.[7] ............................. F16K 17/14; F16K 15/14
[52] U.S. Cl. ................. 137/70; 137/71; 137/846
[58] Field of Search .................... 137/846, 844, 137/843, 847, 70, 71; 222/490

[56] References Cited

U.S. PATENT DOCUMENTS

| | | | |
|---|---|---|---|
| 2,802,608 | 8/1957 | Gassaway . | |
| 3,339,734 | 9/1967 | Kasten | 137/71 |
| 3,416,665 | 12/1968 | Kasten | 137/70 |
| 3,825,157 | 7/1974 | Herzig . | |
| 3,935,975 | 2/1976 | Gauntlett . | |
| 4,226,342 | 10/1980 | Laauwe . | |
| 4,321,954 | 3/1982 | Black | 137/71 |
| 4,396,032 | 8/1983 | Duchesne et al. | 137/71 |
| 4,430,392 | 2/1984 | Kelley et al. | 137/70 |
| 4,524,805 | 6/1985 | Hoffman | 137/846 |
| 4,535,818 | 8/1985 | Duncan et al. | 137/846 |
| 5,052,594 | 10/1991 | Sorby . | |
| 5,339,995 | 8/1994 | Brown et al. . | |
| 5,387,395 | 2/1995 | Coassin et al. | 137/846 |
| 5,676,289 | 10/1997 | Gross et al. . | |
| 5,680,969 | 10/1997 | Gross . | |
| 5,697,525 | 12/1997 | O'Reilly et al. . | |
| 5,743,443 | 4/1998 | Hins . | |
| 5,897,033 | 4/1999 | Okawa et al. . | |
| 5,906,316 | 5/1999 | Gatzemeyer et al. . | |
| 5,924,452 | 7/1999 | Szpara et al. | 137/846 |

*Primary Examiner*—Denise L. Ferensic
*Assistant Examiner*—Joanne Y. Kim

[57] ABSTRACT

Disclosed herein are closures that are formed via an injection molding process with a thin breakable web. When they are first placed in a fluid conduit and exposed to line pressure the web will break open so as to thereby create a duckbilled type check valve. Thus, the closure can provide a seal during long-term storage prior to use. However, once used it functions as a check valve.

7 Claims, 2 Drawing Sheets

DUCKBILLED CHECK VALVES AND METHODS OF MAKING AND USING SAME

CROSS-REFERENCE TO RELATED APPLICATIONS

Not Applicable

STATEMENT REGARDING FEDERALLY SPONSORED RESEARCH/DEVELOPMENT

Not Applicable

BACKGROUND OF THE INVENTION

The present invention relates to closures that provide a seal prior to their first use, and thereafter burst open to form a check valve to provide backflow protection.

A check valve is a type of valve that permits flow of a fluid in one direction while inhibiting reverse flow. Such valves are typically used to prevent contamination of plumbing systems. "Duckbilled" type check valves usually have a cylindrical base/inlet end that fits snugly into a conduit through which the fluid will be flowing. The outlet end of the valve tapers somewhat like the bill of a duck. There is a central bore extending through the valve between the entry and outlet. Normal fluid flow drives the flexible duckbill open and permits flow through the valve. Reverse flow drives the bill closed.

Prior art duckbilled check valves are available from many suppliers. Three such suppliers are Vernay Laboratories, Eagle-Picher and Moxness.

While duckbilled check valves have been used in a wide variety of applications, they are particularly well suited for use in nozzle assemblies that assist in dispensing actives (e.g. cleaners, fertilizers, herbicides, pesticides) from the end of a garden hose. See e.g. check valve 15 in U.S. Pat. No. 5,906,316. The disclosure of this patent and of all other publications referred to herein are incorporated by reference as if fully set forth herein.

Duckbilled check valves are typically made from elastomeric materials such as styrene-butadiene, nitrile, and silicone via compression molding. In such a process the valve is usually formed without the front bill slit. The bill is then cut to form the outlet at the "lips" of the bill in a secondary operation. This cutting step adds some cost and requires careful process control (which can slow the rate of production). Also, the resulting valve is designed to always permit flow from the inlet to the outlet end of the valve.

In U.S. Pat. No. 2,802,608 there was disclosed a closure that sealed various consumer products prior to first use. The closure was designed to be broken open prior to first use. However, the closure relied on external manual pressure to open it and to close it.

There is a need for improved ways of forming duckbilled check valves.

BRIEF SUMMARY OF THE INVENTION

The invention provides a closure having a body with an inlet at one end and a tapered elastomeric bill at an opposite end. The bill has opposed lips and a breakable linear web sealing the lips together. The lips and web are juxtaposed and formed such that fluid flow through the body against inside surfaces of the lips can cause the web to break and thereby create a duckbill check valve that can permit flow in one direction through a conduit while restricting flow in the opposite direction.

In preferred forms the body is tubular at the inlet end and the web has a thickness of less than 0.13 mm, a width of less than 1.02 mm, and a length of less than 4.57 mm. Also, the closure is a single piece formed via an injection molding process using thermoplastic elastomeric synthetic rubber. When the web breaks open it is designed to leave lips that are essentially non-deformed so that the bill can act as an effective check valve against reverse flow.

The invention also provides a method of forming a duckbilled check valve. One obtains the above closure and then causes fluid flow to flow through the body against inside surfaces of the lips so as to break the web (while leaving the lips substantially non-deformed). This creates a duckbill check valve.

In yet another form the invention provides a method of restricting flow of fluid through a plumbing conduit. One positions the above closure in a conduit. After the web breaks open, the resulting valve will restrict flow in one direction (the reverse direction). For purposes of this patent, a "plumbing" conduit is any conduit carrying a liquid, including without limitation conduits that carry water in and/or from buildings or agricultural supply sources (e.g. a garden hose).

Various elastic materials can be used to form the valves of the present invention. Most preferred are thermoplastic rubber materials suitable for injection molding. Examples of this type of thermoplastic material are Santropreme® 35 available from Advance Elastomer Systems and Kraton® available from Shell Chemical Company.

The above described closures can be formed using a variety of molding techniques. However, if (for example) compression molding is used for this purpose obtaining the proper thickness and tolerances for the web can be time consuming and difficult. Thus, it is preferred to use an injection molding process in which the thermoplastic is injected into a mold and formed into the closure in the mold.

When a material such as Santropreme® 35 is used with a check valve that is designed to have a 2.82 mm diameter inlet flange, the web is preferably dimensioned so as to have a thickness between 0.12 mm and 0.15 mm, a width between 0.89 mm and 1.14 mm, and a length of between 4.45 mm and 4.70 mm. However, these optimal dimensions will vary slightly depending on the diameter of the conduit in which the valve will be placed, the elastomeric material used, the rate of maximum flow desired, and the likely pressure of the fluid that the valve will be exposed to.

It can therefore be appreciated that the present invention provides a closure that can provide a storage seal until the product is first used. Upon use it becomes a duckbilled check valve that operates automatically, without the need for manual activation or closure. Further, the closures of the present invention do not require a separate cutting operation after the molding of the valve.

These and still other advantages of the present invention will be apparent from the description of the preferred embodiments which follow.

DETAILED DESCRIPTION OF THE INVENTION

Figure 1:
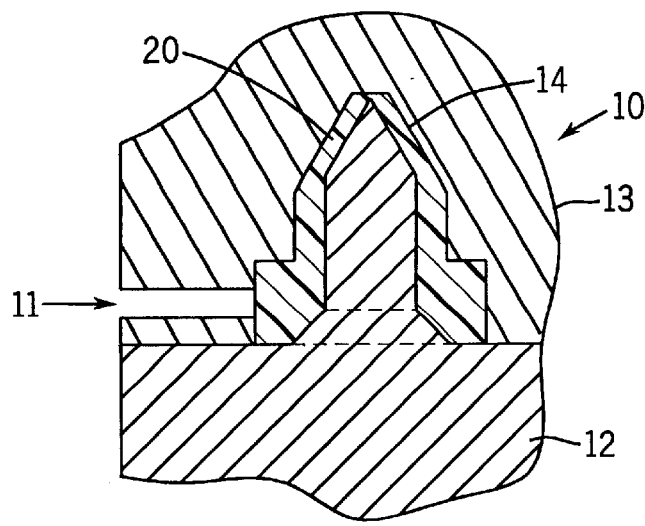
FIG. 1 is a cross sectional view of an injection mold in which a closure of the present invention has been formed.

As best seen in FIG. 1, the closures of the present invention can be formed in an injection mold. Such molds typically have a mold body 10, with an injector path 11 into which an injector (not shown) can be removably inserted. The mold body is formed in sections 12, 13 which can be separated from each other so as to expose an internal cavity 14 in which closure 20 is formed.

When Santropreme® 35 is the thermoplastic, standard recommended molding conditions can be used, with optimization for the part size. The thermoplastic is injected through pathway 11 until the cavity 14 is filled. The mold is then permitted to cool. The mold sections 12 and 13 are separated from each other and the formed closure removed. The preferred injection molding process permits efficient use of material, with elimination of secondary operations.

Figure 2:
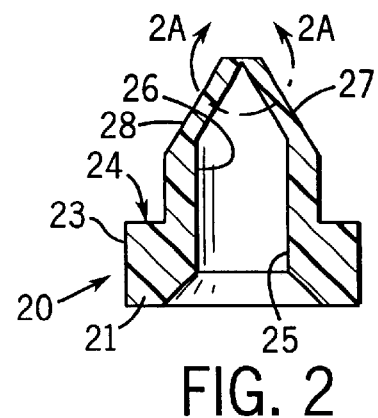
FIG. 2 is a cross sectional view of a closure of the present invention, with its web shown in unbroken form.

As seen in FIG. 2, the closure 20 is basically tubular/cylindrical, with a wide inlet end flange 21. This flange assists in retaining the check valve in a single position in a conduit while sealing off flow around the outside of the check valve. In this regard, when a valve of this type is positioned in a conduit it is preferably positioned at a place where the conduit narrows inwardly in a stepped fashion so that both surfaces 23 and 24 of the closure seal against the conduit. There is a central pathway 25 which extends through narrowed tubular section 26.

Figure 2A:
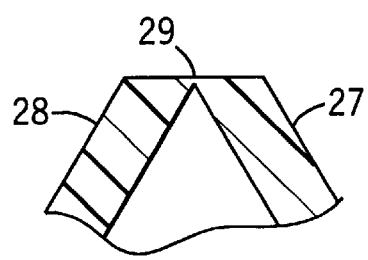
FIG. 2A is an enlarged view of the portion of FIG. 2 designated by the marking 2A—2A.
Figure 3:
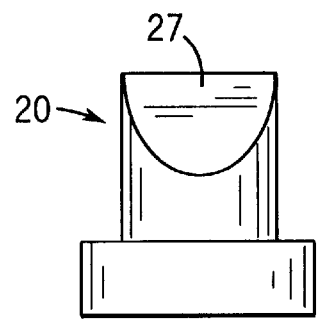
FIG. 3 is a side view of the closure of FIG. 2, the opposite side view thereof being identical thereto.
Figure 4:
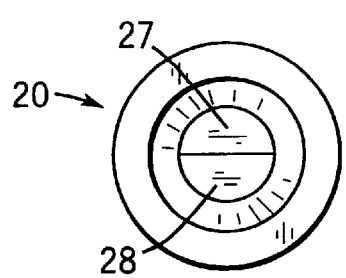
FIG. 4 is a plan view of that closure taken from the inlet end.
Figure 5:
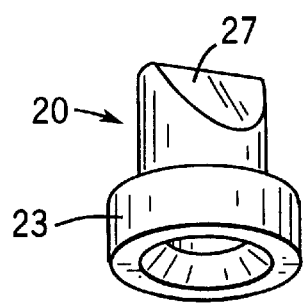
FIG. 5 is a perspective view of that closure.
Figure 6A:
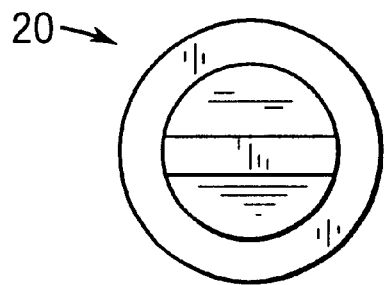
FIG. 6A is a plan view of that closure taken from the outlet end.
Figure 6B:
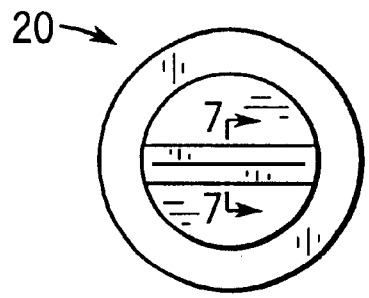
FIG. 6B is a view similar to FIG. 6A, albeit with the web shown as having previously been broken.

The valve body is also formed with tapering lips 27 and 28. As best seen in FIG. 2A, there is a breakable thin (preferably linear) web 29 that is integrally formed with the lips and holds them together while simultaneously preventing air leakage out the closure during storage.

Figure 7:
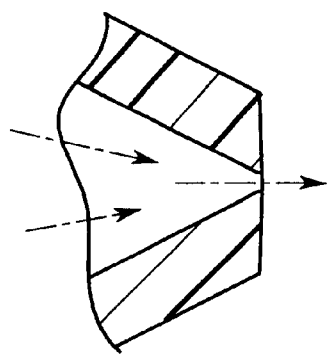
FIG. 7 is an enlarged cross sectional view taken along line 7—7 of FIG. 6B, albeit with a fluid shown passing through the valve.

With standard plumbing pressures (such as 0.172 to 0.689 MPa), web 29 will be break along the seam between the lips (as best seen in FIG. 7). When the injection molding process is used, and the web is sufficiently thin, the break will be sufficiently smooth such that the resulting structure can reliably operate as a check valve.

The preceding description is merely of preferred embodiments of the invention. One skilled in the art should readily appreciate that alternative embodiments will also fall within the scope and breadth of the invention.

For example, the dimensions of the closure (and thus check valve) may be modified, and such closure/check valves may be used in a wide variety of different applications apart from those involving water. For example, they can be used in systems that carry high pressure gasses or other liquids. Thus, the claims should be looked to in order to understand the full scope of the invention.

INDUSTRIAL APPLICABILITY

Closures are disclosed for retarding the flow of fluid, and after first use permitting flow in one direction while preventing it in the opposite direction. Such closures are particularly useful in connection with nozzles and aspirators that deliver actives through garden hoses.

We claim:

1. A closure, comprising:
    a body having an inlet at one end and a tapered elastomeric bill formed at an opposite end;
    the bill having opposed lips and a breakable linear web sealing the lips together;
    wherein the lips and web are juxtaposed and formed such that fluid flow through the body against inside surfaces of the lips can cause the web to break without permanently deforming the lips, so as to thereby create a duckbill check valve which will permit fluid flow between the lips in one direction but not in an opposite direction.

2. The closure of claim 1, wherein the body is tubular at its inlet end and the web has a thickness of less than 0.13 mm, a width of less than 1.02 mm, and a length of less than 4.57 mm.

3. The closure of claim 1, wherein the closure is a single piece formed via an injection molding process.

4. The closure of claim 1, wherein the closure is formed from a synthetic rubber.

5. The closure of claim 4, wherein the synthetic rubber is a thermoplastic elastomer.

6. A method of forming a duckbilled check valve, comprising:
    obtaining a closure having a body with an inlet at one end and a tapered elastomeric bill formed at an opposite end, the bill having opposed lips and a breakable linear web sealing the lips together; and
    causing fluid flow to flow through the body against inside surfaces of the lips so as to thereby break the web without permanently deforming the lips;
    whereby a duckbill check valve is formed which will permit fluid flow in one direction between the lips but not in an opposite direction.

7. A method of restricting flow of fluid through a plumbing conduit comprising positioning a closure of claim 6 in a conduit.

* * * * *